United States Patent [19]

Mountz

[11] 4,198,187
[45] Apr. 15, 1980

[54] RAMP AND RAMP CARRIER FOR TRUCKS AND THE LIKE

[75] Inventor: Elton E. Mountz, Morgantown, Pa.

[73] Assignee: Morgan Trailer Mfg. Co., Morgantown, Pa.

[21] Appl. No.: 925,301

[22] Filed: Jul. 17, 1978

[51] Int. Cl.² ............................................... B60P 1/00
[52] U.S. Cl. ..................................... 414/537; 14/71.5; 296/50; 296/204; 280/800
[58] Field of Search ................ 214/537, 538; 280/793, 280/797, 800; 296/35 A, 26, 50, 204; 14/69.5, 71.1, 71.5, 72.5; 414/537, 538

[56] References Cited
U.S. PATENT DOCUMENTS

| | | | |
|---|---|---|---|
| 2,603,506 | 7/1952 | Johnson | 280/800 X |
| 3,511,393 | 5/1970 | Abromavage et al. | 414/537 |
| 3,763,827 | 10/1973 | Burkart | 414/537 X |

*Primary Examiner*—Stephen G. Kunin
*Attorney, Agent, or Firm*—Zachary T. Wobensmith, 2nd; Zachary T. Wobensmith, III

[57] ABSTRACT

A ramp and ramp carrier for trucks and the like is disclosed in which the truck body is provided with long rails comprising channels facing inwardly and which carry the cross members and truck floor, the long rails being supported and secured to the spaced parallel truck frame rails, with interposed spacers of wood, the securing elements being exteriorly of the channels and truck frame to avoid interior interference with the ramp, the ramp being carried between and by the long rails with provisions for retention and, upon withdrawal for use, with the outer end on the ground having members for hooking over a rear plate on the body.

9 Claims, 9 Drawing Figures

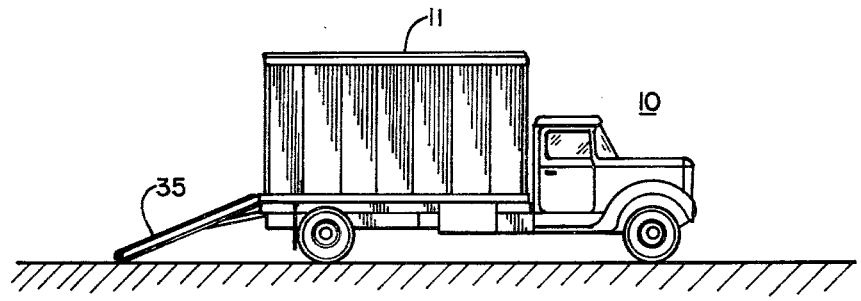
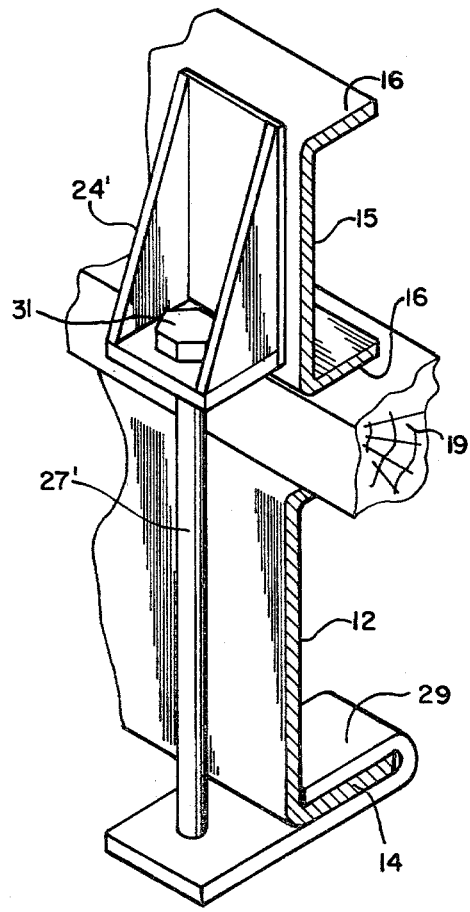

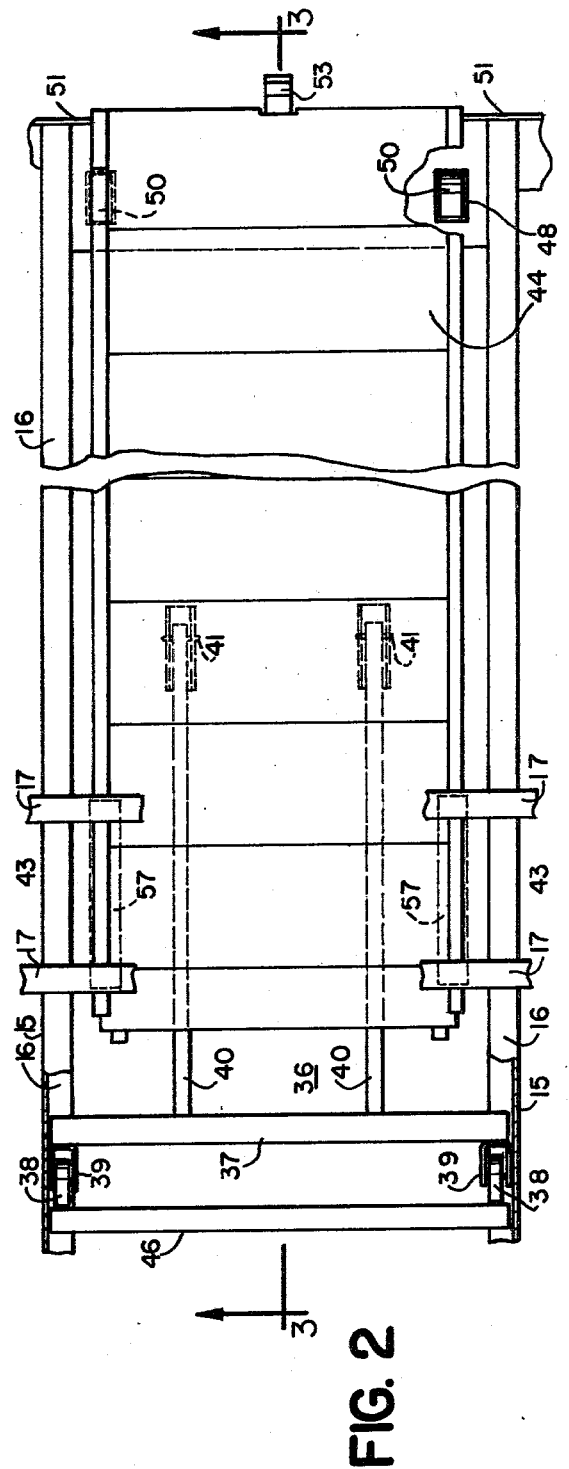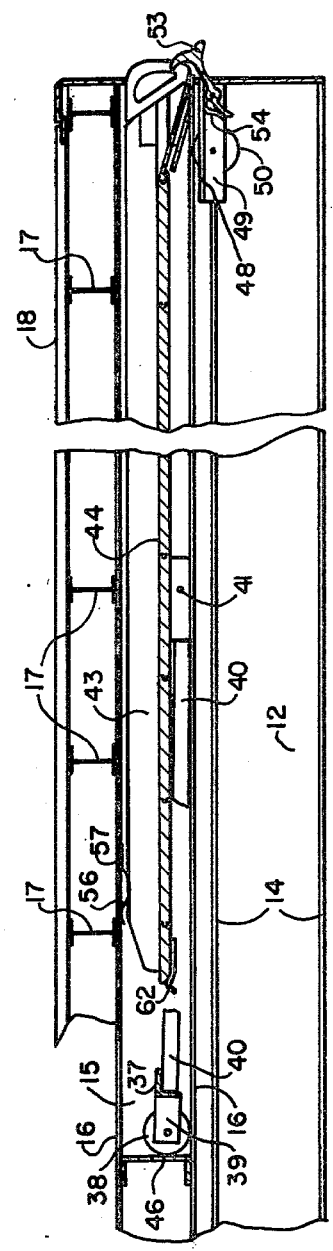
FIG. 2
FIG. 3

RAMP AND RAMP CARRIER FOR TRUCKS AND THE LIKE

BACKGROUND OF THE INVENTION

1. Field of the Invention

This invention relates to ramp and ramp carriers for trucks and the like in which the ramp is stored beneath the body of the truck and is accessible at the rear of the truck body for withdrawal for use.

2. Brief Description of the Prior Art

It has heretofore been proposed to employ ramps for trucks. One structure for this purpose is shown in FIG. 6 which illustrates the heretofore common practice of employing parallel long rails a, usually I-beams, lengthwise beneath the body with a truck body floor b carried on cross members c, secured to the long rails, the long rails a being secured on each side to the parallel longitudinal truck frame members d, usually channels, with an interposed filler strip e, usually of wood, the long rails a being secured by inverted U-bolts f engaged over the top of the long rails a, having nuts g engaged with a cross plate h bearing on the bottoms of the truck frame members d. The walk ramp carrier comprised inwardly facing channels i welded to the cross members c.

This construction added to the overall weight of the vehicle and added to the cost of construction.

SUMMARY OF THE INVENTION

In accordance with the invention a ramp and ramp carrier for trucks is provided in which the long rails of the truck body which carry the truck floor are employed as a ramp carrier and are made as parallel facing channels for engagement by rollers carried on a ramp frame which is pivotally connected to the ramp body, the ramp carrier having an outer end plate with a latch to retain the ramp in collapsed or nested position for travel but permits retraction of the ramp, when desired, the ramp plate having inner and outer stops for the ramp frame rollers, and having rollers for facilitating the outward movement of the ramp for use.

It is the principal object of the invention to provide an improved ramp and ramp carrier for trucks and the like which utilizes part of the supporting structure of the truck body, more specifically long rails made of facing channels, as a carrier for the ramp.

It is a further object of the invention to provide a ramp and ramp carrier for trucks and the like which is simple in construction, permits of reduction of total weight and cost and which will be strong, sturdy and reliable in use.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which:

FIG. 1 is a side elevational view of a truck and truck body with the ramp in extended position for use;

FIG. 2 is a top plan view of the ramp carrier with the ramp in collapsed condition for storage, parts being omitted in the interests of clarity;

FIG. 3 is a longitudinal vertical sectional view taken approximately on the line 3—3 of FIG. 2;

FIG. 9 is a fragmentary view in perspective showing an alternative mode of connection of the long rails of the truck body to the truck frame.

Figure 6:
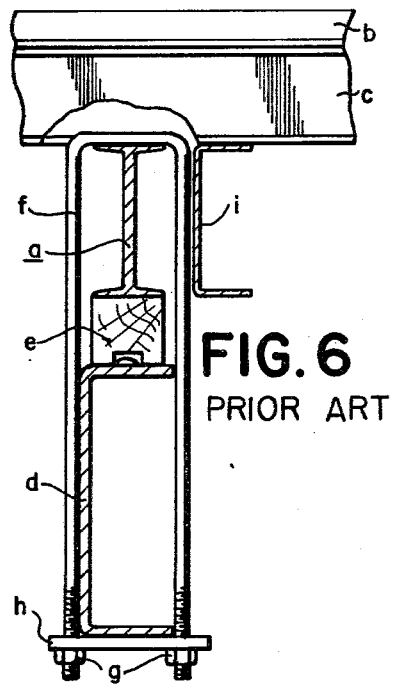
FIG. 6 is a transverse vertical sectional view similar to FIG. 5 showing a prior art connection of one of the long rails to one of the truck frame members and the location of the ramp carrier there employed.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to the drawings, and first to FIG. 1 a truck 10 is shown having a body 11 of any desired type, the truck 10 having parallel horizontal longitudinally extending frame rails or members 12 with their flanges 14 facing inwardly and the truck body 11 having parallel horizontal longitudinally extending long rails 15. The rails 15 are preferably channels with their flanges 16 facing inwardly. The rails 15 preferably have secured thereto, as by welding, transverse cross members 17 to which the truck body floor 18 is secured in any desired manner. Wood filler strips 19 are preferably interposed between the lower flange 16 of the long rail 15 and the upper flange 13 of the truck frame member 12.

Figure 5:
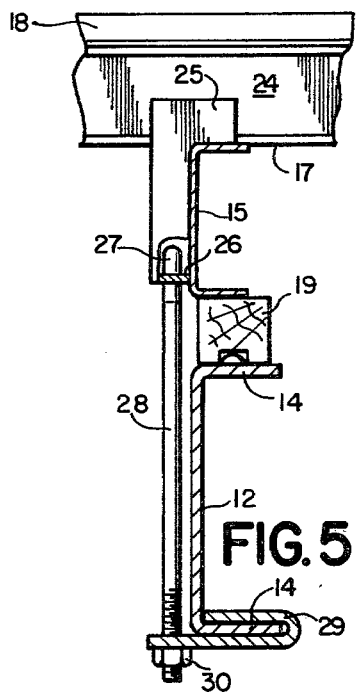
FIG. 5 is a transverse vertical sectional view through one of the long rails of the truck body and the truck frame and illustrating further details of the structure of FIG. 4.
Figure 4:
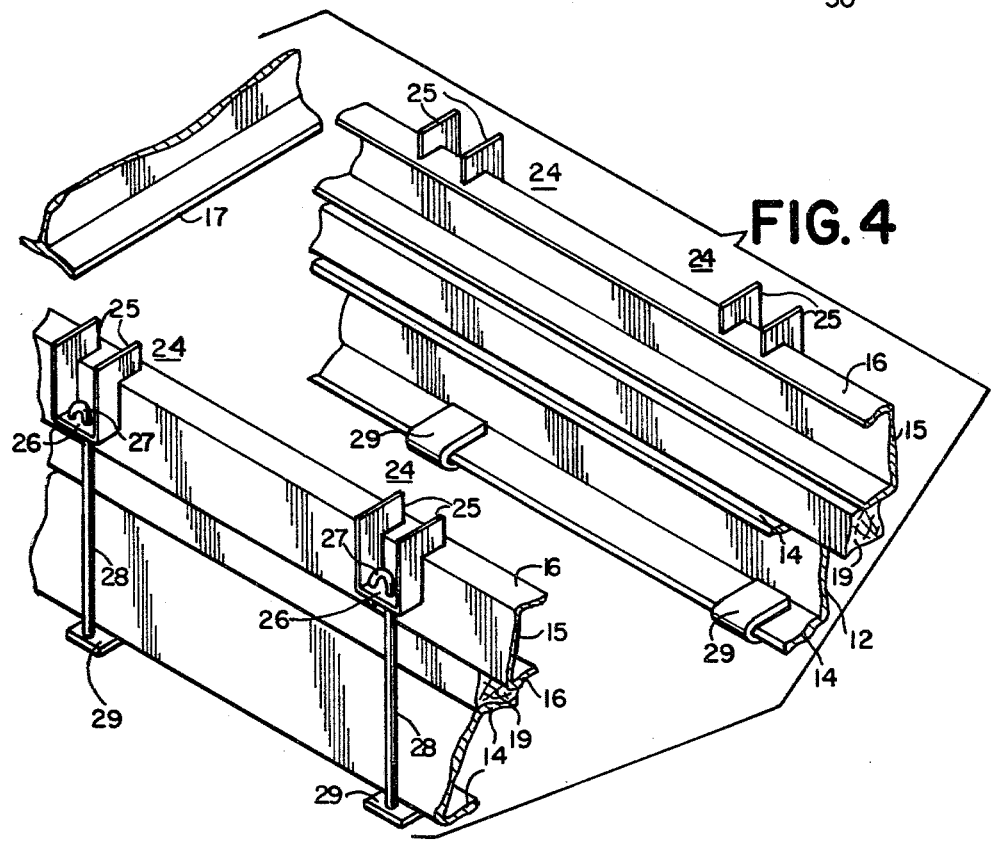
FIG. 4 is a fragmentary view in perspective showing one mode of securing the long rails of the truck body to the truck frame in accordance with the invention.
Figure 7:
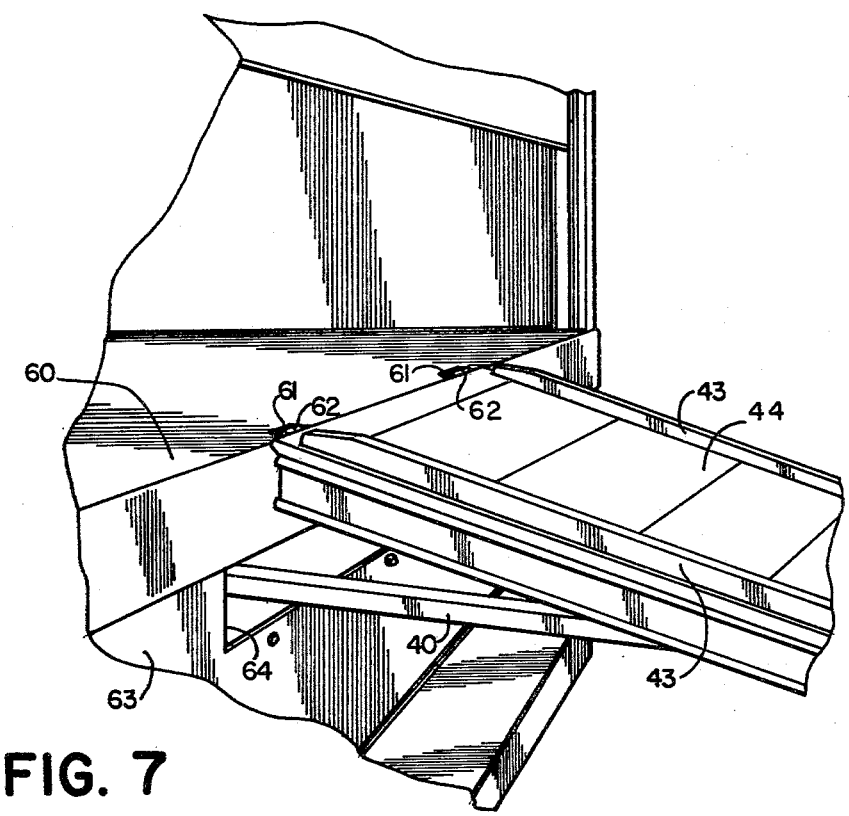
FIG. 7 is a view in perspective showing the ramp in its outward position and hooked over the rear sill of the truck body.
Figure 8:
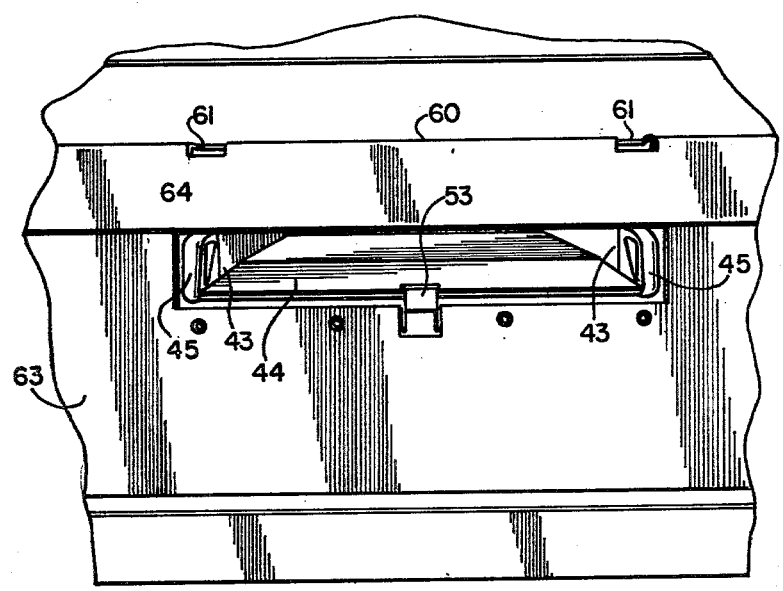
FIG. 8 is a fragmentary rear view in perspective showing the ramp in its storage position.

The long rails 15 are shown as equally spaced and superposed on the truck frame rails 12, and are clamped together in any desired manner which does not obstruct the long rails 15. One preferred mode of retention is shown in FIGS. 5 and 6 in which upper brackets 24 are employed. These brackets are shown as having spaced inverted vertical L-shaped plates 25 welded to the long rails 15, the plates 25 being connected by a bottom bracket plate 26 into which an inverted J-shaped bolt 27 is engaged. Each bolt 27 has a vertically downwardly extending threaded shank 28 which extends through a J-shaped clamping plate 29. The plate 29 extends under the lower face of the lower flange 14 of the frame rail 12 and over the upper face of the lower flange 14 in engagement therewith. Nuts 30 on the lower threaded ends of the shanks 28 retain the long rails 15 clamped to the truck frame rails 12.

In FIG. 9 an alternative form of upper bracket 24' is shown which is welded or otherwise secured to the outer face of the long rail 15, with a bolt 27' extending through the bracket 24'. The bolt 27' has a hexagonal head 31 and a shank 28 which extends as previously described through a clamping plate 29 for retention by a nut 30.

Referring to FIG. 1 the ramp is shown generally at 35 but in extended and inclined position for use.

Referring now to FIGS. 2 and 3, the details of the ramp 35 and the ramp carrier are there shown.

The ramp 35 includes a ramp carrier frame 36 with a transverse frame bar 37 extending between the long rails 15 and carrying rollers 38 in roller brackets 39 for rolling engagement with the upper faces of the lower flanges 16 of the long rails 15. The bar 37 has a pair of spaced bars 40 extending rearwardly therefrom for pivotal connection to horizontal pivot pins 41 on the lower face of the ramp body 42. The ramp body 42 has side frame bars 43 with a ramp floor 44 preferably of planking therebetween and below the upper faces of the frame bars 43. The outer ends of the side frame bars 43 are preferably provided with handles 45 to facilitate moving the ramp body 42.

A stop 46 extending between the long rails 15 limits the inward movement of the frame 36 and the ramp 35.

At the outer end of the long rails 15 a transverse horizontal plate 48 extending therebetween is welded to the rails 15. The plate 48, spaced inwardly with respect to the rails 15 and at locations for engagement by the side frame bars 43 of the ramp body 42 has roller brackets 49 which carry pivotally mounted rollers 50 for aiding inward and outward movement of the ramp body 42. Limit stops 51 extending above the upper faces of the lower flanges 16 limit the outward movement of the rollers 38 and of the ramp body 42.

The plate 48 intermediate the long rails 15 has a releasable catch 53 normally urged counterclockwise by a spring 54 to engage the outermost edge of the ramp floor 44 but movable clockwise to release it from engagement with the ramp floor 44 for outward movement of the ramp body 42.

At the inner end of the side frame bars 43, when they are at their innermost positions, anti-vibration springs 56 are provided, connected at one of their ends to spring carrying plates 57 which are secured to contiguous cross members 17.

The rear sill 60 of the truck body 11 can have spaced notches 61 provided therein for engagement by hooks 62 on carried on the bottom of the ramp floor 44. The sill 60 can also have a downwardly extending apron 63 enclosing the ramp carrier and with an opening 64 for access to the outer end of the ramp body 42.

The mode of operation will now be pointed out.

With the ramp 35 disposed inwardly for movement of the truck 10 the ramp body 42 is retained with the rollers 38 at the stop 46 by the engagement of the catch 53 with the outer end of the ramp floor 44. The springs 56, by their engagement with the side frame bars 43 will reduce the tendency of upward movement at that location and prevent vibration.

If it is desired to use the ramp 35, the catch 53 is released and the handles 45 are available to aid in the outward movement.

Upon outward movement the rollers 38 support the ramp carrier frame 36 at the inner end and the rollers 50 permit easy outward movement of the side frame bars 43 thereover.

As the ramp body 42 is moved outwardly and the inner end of the ramp body 42 is outside the sill 60 and apron 63 the rollers 38 engage the stops 51. The pivots at 41 permit the outer end of the ramp body 42 to swing downwardly so that the outer end rests on the ground and the ramp body 42 can then be moved to engage the hooks 62 in the notches 61 for security in holding the upper end of the ramp body 42.

The ramp body 42 can be returned to its initial position by a reversal of the outward movements.

I claim:

1. A ramp and ramp carrier for trucks and the like having a truck frame and a truck body thereon comprising
    spaced longitudinally extending truck frame rails forming a part of the truck frame,
    spaced longitudinally extending body rails interposed between the truck frame rails and the truck body and superposed directly above on said truck frame rails,
    said body rails comprising facing channels supporting the body and providing an unobstructed ramp trackway,
    members disposed exteriorly of the body rails and at the outer faces of the rails for retaining said truck frame rails and said body rails in assembled relation, and
    a ramp disposed between said body rails and supported tiltably by said body rails at its inner end for movement inwardly to a storage position and outwardly to an extended position for use with its inner end engaged with the truck body and its outer end on the ground.

2. The combination defined in claim 1 in which
    said members include a bracket in engagement with said truck frame rail and a bolt in engagement with said bracket.

3. The combination defined in claim 1 in which
    said members include
        an upper bracket in engagement with said body rail,
        a lower bracket in engagement with said truck frame rail, and
        a bolt in engagement with said upper and lower brackets.

4. The combination defined in claim 1 in which
    a ramp carrier frame is provided having rollers in rolling engagement in said body rails, and
    said ramp is pivotally connected to said carrier frame intermediate the ends of the ramp.

5. The combination defined in claim 1 in which
    said ramp carrier frame has a transversely disposed member on which said rollers are carried, and
    rearwardly extending bars which are pivotally connected to said ramp.

6. The combination defined in claim 1 in which
    said ramp has side rails, and
    said body rails contiguous to the rear end thereof have spaced rollers supported thereby for engagement by said ramp side rails.

7. The combination defined in claim 1 in which
    the truck body has a rear sill with spaced notches at the upper side thereof, and
    said ramp at its inner end has hooks for engagement in said notches in said extended position.

8. The combination defined in claim 1 in which
    a releasable latch is provided for retaining said ramp in its storage position.

9. The combination defined in claim 1 in which
    resilient members are provided interposed between a portion of said truck body and said ramp in engagement with said ramp for restraining movement thereof in the storage position.

* * * * *